United States Patent
Ge et al.

(10) Patent No.: US 12,067,970 B2
(45) Date of Patent: Aug. 20, 2024

(54) METHOD AND APPARATUS FOR MINING FEATURE INFORMATION, AND ELECTRONIC DEVICE

(71) Applicant: BEIJING BAIDU NETCOM SCIENCE TECHNOLOGY CO., LTD., Beijing (CN)

(72) Inventors: Jiaxiang Ge, Beijing (CN); Zhen Wu, Beijing (CN); Maoren Zhou, Beijing (CN); Qiguang Zang, Beijing (CN); Ming Wen, Beijing (CN); Xiaoyin Fu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 480 days.

(21) Appl. No.: 17/500,188

(22) Filed: Oct. 13, 2021

(65) Prior Publication Data
US 2022/0036879 A1    Feb. 3, 2022

(30) Foreign Application Priority Data
Nov. 23, 2020    (CN) .......................... 202011325103.7

(51) Int. Cl.
*G10L 15/02* (2006.01)
*G10L 15/06* (2013.01)
*G10L 15/20* (2006.01)
*G10L 15/22* (2006.01)

(52) U.S. Cl.
CPC ............ *G10L 15/02* (2013.01); *G10L 15/063* (2013.01); *G10L 15/20* (2013.01); *G10L 15/22* (2013.01)

(58) Field of Classification Search
CPC ........ G10L 15/02; G10L 15/063; G10L 15/20
See application file for complete search history.

(56) References Cited

U.S. PATENT DOCUMENTS

| 10,319,374 B2 | 6/2019 | Catanzaro et al. |
| 2016/0358599 A1* | 12/2016 | Wang ...................... G10L 15/20 |
| 2016/0368438 A1* | 12/2016 | Qian ..................... B60R 16/037 |

(Continued)

FOREIGN PATENT DOCUMENTS

| CN | 102411930 A | 4/2012 |
| CN | 108242234 A | 7/2018 |
| CN | 109378010 A | 2/2019 |

(Continued)

OTHER PUBLICATIONS

Chinese Office Action dated Sep. 28, 2021 as received in application 202011325103.7.

(Continued)

*Primary Examiner* — Ibrahim Siddo
(74) *Attorney, Agent, or Firm* — Maschoff Brennan (57) ABSTRACT

A method for mining feature information, an apparatus for mining feature information and an electronic device are disclosed. The method includes: determining a usage scenario of a target device; obtaining raw audio data including real scenario data, speech synthesis data, recorded audio data and other media data; generating target audio data of the usage scenario by simulating the usage scenario based on the raw audio data; and obtaining feature information of the usage scenario by performing feature extraction on the target audio data.

20 Claims, 5 Drawing Sheets

(56) References Cited

U.S. PATENT DOCUMENTS

2017/0004844 A1     1/2017   Short et al.
2019/0378496 A1    12/2019   Yasuda et al.

FOREIGN PATENT DOCUMENTS

| | | | |
|---|---|---|---|
| CN | 111145730 | A | 5/2020 |
| CN | 111326174 | A | 6/2020 |
| CN | 111402875 | A | 7/2020 |
| CN | 111862945 | A | 10/2020 |
| JP | H05-73088 | A | 3/1993 |
| JP | 2002-140089 | A | 5/2002 |
| JP | 2018-513399 | A | 5/2018 |
| JP | 2019-211689 | A | 12/2019 |

OTHER PUBLICATIONS

JP Office Action dated Nov. 29, 2022 as received in Application No. 2021-179501.

* cited by examiner

METHOD AND APPARATUS FOR MINING FEATURE INFORMATION, AND ELECTRONIC DEVICE

CROSS REFERENCE TO RELATED APPLICATIONS

This application claims priority to Chinese Patent Application No. 202011325103.7, filed on Nov. 23, 2020, the content of which is incorporated herein by reference in its entirety.

TECHNICAL FIELD

The disclosure generally relates to the field of data processing techniques, specifically to the field of artificial intelligence technologies such as speech recognition, machine learning and deep learning.

BACKGROUND

Currently, with the rapid development of speech recognition technologies, various smart devices based on speech recognition technologies are used widely, such as smart speakers, smart vehicle-mounted devices and hall guides. When it make attempts to recognize a segment of speech, it is necessary to firstly extract features of the speech and input the extracted features into a pre-established speech model of a usage scenario to realize speech recognition.

However, for different usage scenarios and different usage purposes from users, a large amount of audio data is required in the process of constructing or training the speech model of the usage scenario. Since the above-mentioned audio data is extremely limited, low efficient, high-cost and long time-consuming problems inevitably occur in the feature information mining process. Therefore, how to improve the efficiency and reliability of the feature information mining process while ensuring the accuracy of feature information results of the usage scenario has become one of the important research directions.

SUMMARY

According to a first aspect, a method for mining feature information is provided. The method includes: determining a usage scenario of a target device; obtaining raw audio data including real scenario data, speech synthesis data, recorded audio data and other media data; generating target audio data of the usage scenario by simulating the usage scenario based on the raw audio data; and obtaining feature information of the usage scenario by performing feature extraction on the target audio data.

According to a second aspect, an apparatus for mining feature information includes at least one processor and a memory communicatively coupled to the at least one processor and stored with instructions executable by the at least one processor. The at least one processor is configured to determine a usage scenario of a target device; obtain raw audio data including real scenario data, speech synthesis data, recorded audio data and other media data; generate target audio data of the usage scenario by simulating the usage scenario based on the raw audio data; and obtain feature information of the usage scenario by performing feature extraction on the target audio data.

According to a third aspect, a non-transitory computer-readable storage medium storing computer instructions is provided. The computer instructions are configured to cause a computer to execute the method for mining feature information according to the first aspect of the disclosure.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings herein are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

The technical fields involved in the solution of the disclosure are briefly described.

Image processing technology, also known as video and image processing technology, refer to a technique that causes a computer to analyze the images to achieve the desired results. The image processing technology is widely used and has played an extremely important role in the fields, such as surveying and mapping sciences, atmospheric sciences and astronomy.

Artificial intelligence (AI) is a subject that causes computers to simulate certain thinking processes and intelligent behaviors (such as learning, reasoning, thinking and planning) of human beings, which covers both hardware-level technologies and software-level technologies. The AI hardware technologies generally include several major aspects such as computer vision technology, speech recognition technology, natural language processing technology, learning/deep learning, big data processing technology and knowledge graph technology.

Deep Learning (DL) is a new research direction in the field of Machine Learning (ML), which is introduced into machine learning closer to its original goal, i.e., AI. The DL is to learn internal laws and representation levels of sample data. The information obtained in the learning process is of great help to interpretation of data such as text, images and sounds. The ultimate goal of DL is to enable machines to have an ability to analyze and learn like humans, having an ability to recognize data such as text, images and sounds. The DL is a complex machine learning algorithm that has achieved results in speech and image recognition far surpassing the related arts.

The ML is a multi-field interdisciplinary subject involving multiple disciplines such as probability theory, statistics, theory of approximation, convex analysis, and algorithm complexity theory, which mainly researches computer simulation or implements human learning behaviors, in order to obtain new knowledge or skills, and to reorganize existing knowledge structure to continuously improve its own performance.

Speech recognition technology, also known as automatic speech recognition (ASR), aims to convert vocabulary content in a human speech into computer-readable inputs, such as keystrokes, binary codes or character sequence. The technique is different from speaker recognition and speaker confirmation, in which the latter tries to recognize or confirm the speaker who made the speech instead of the vocabulary content contained therein.

It should be noted that the speech recognition technology is a machine learning process. Therefore, the accuracy of the feature information mining results depends on a characteristic capability and a coverage of the extracted features. However, traditional feature information mining is limited to employing various extraction methods to only a segment of audio, seeking for more accurate methods to characterize audio features, and employing a large number of diverse scenario audio features for modeling to improve the recognition accuracy.

Currently, in the speech recognition technology, the two most widely used methods for feature information mining are: Filter Bank (FBank) and Mel Frequency Cepstrum Coefficient (MFCC). However, methods like the FBank and MFCC only extract spectral information from a segment of audio. Each segment of speech is an audio generated and recorded when a user interacts with a machine in a fixed scenario. Therefore, the extracted features for the feature information are also fixed in a fixed number of audios.

Especially, for industrial-level speech recognition application scenarios, requirements for the recognition accuracy and false alarm rate are very high. The usage scenarios are wide such as homes, halls, shopping malls, cars and offices. The interaction intentions from users are rich such as controlling a furniture, guiding, navigation, consulting, broadcasting, small chatting and alarm clocks. During the speech recognition modeling process for each scenario and intention, it is necessary to extract a large amount of features to improve recognition ability of the model, while the audio data for these scenarios is limited. In addition, new application scenarios often face the data cold-start problem.

Therefore, a method for mining feature information is according to the disclosure, which uses scenario simulation methods to iteratively mine features of a source audio based on fixed audio data, to solve various problems lacking of scenario data. A method for synthesizing audios with speeches is adopted to synthesize the missing data to solve the problem of incomplete coverage of user intentions. Meanwhile, data may be enriched by recording audios and collecting other media data. The scenario simulation methods are performed based on these data to continuously and iteratively mine features, thereby improving the accuracy and reducing false alarm rates, overcoming shortcomings of the above two methods, enabling the feature information of the scenario to be obtained more accurately, and improving the efficiency and reliability in the feature information mining process.

A method for mining feature information, and an apparatus for mining feature information and an electronic device according to embodiments of the disclosure are described with reference to the drawings.

Figure 1:
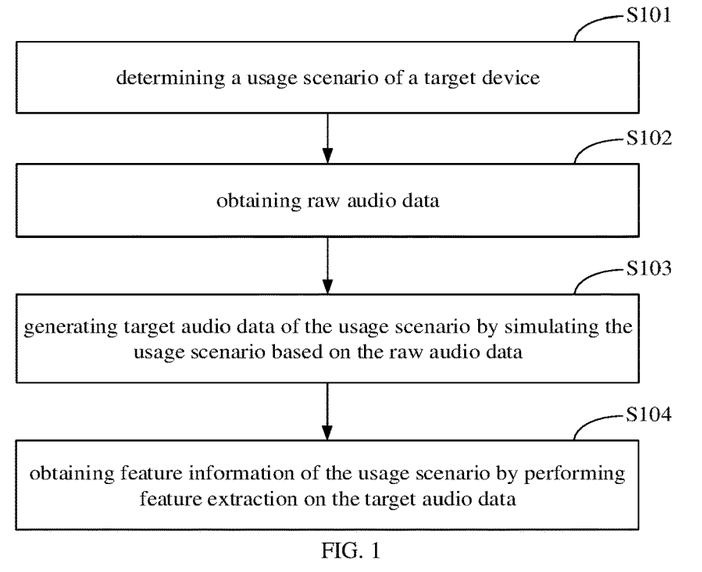
FIG. 1 is a schematic diagram according to a first embodiment of the disclosure.

FIG. 1 is a schematic diagram according to a first embodiment of the disclosure. It should be noted that the execution subject of the method for mining feature information of the embodiments is a server. As illustrated in FIG. 1, the method for mining feature information according to the embodiments includes the following blocks.

At block S101, a usage scenario of a target device is determined.

It should be noted that for different usage scenarios such as homes, halls, shopping malls, cars and offices, the target device, environment, operation objects and interaction intentions are different. Therefore, in order to be able to mine the feature information of the scenario more accurately, the usage scenario of the target device is determined in the embodiments of the disclosure.

The target device may be any specified device, such as a TV, an air conditioner and a heater.

The usage scenario may be any specified scenario, such as a living room, a meeting room and a parking lot.

At block S102, raw audio data is obtained.

The raw audio data may include: real scenario data, speech synthesis data, recorded audio data and other media data.

The real scenario data is audio data actually generated by users using speech interaction products, and these data have certain scenario environment feature information, including spatial reverberation and noises, and so on.

The speech synthesis data is obtained by synthesizing audios based on texts, the content of which is determined according to the interaction intentions of using the speech interaction products. For example, the interaction intentions of the smart speaker include "playing music", "querying the weather" and "setting an alarm". These texts are used to obtain the audio data through the speech synthesis, which effectively solves the problem of missing data or no training data when the product is cold-started.

The recorded audio data is obtained by collecting audio data through recording devices. The recorded content includes speech interaction intention content required in the usage scenario of the products, and environmental noise content.

Other media data includes audio data such as live broadcasts, news broadcasts, interviews and TV stations, which may improve robustness of the model.

At block S103, target audio data of the usage scenario is generated by simulating the usage scenario based on the raw audio data.

It should be noted that in the raw audio data, some problems may occur such as a high cost, a long period, required to label, insufficient data for new products in obtaining the real scenario data. Furthermore, audio features of speech synthesis data, recorded audio data and other media data do not include the scenario information.

Therefore, in order to improve the coverage rate of audio features, the usage scenario in the embodiments of the disclosure may be simulated based on the raw audio data to generate the target audio data of the usage scenario after adding scenario and noise information to the raw audio data.

At block S104, feature information of the usage scenario is obtained by performing feature extraction on the target audio data.

The feature extraction refers to a processing method of converting the target audio data into feature vectors, mainly for an audio decoding and a semantic judgment. The audio decoding includes an audio coding, a Connectionist Temporal Classification (CTC) model and an attention calculation. In addition, the semantic judgment is performed on the recognition result by a semantic model. The audio coding is configured to convert audio signals into implicit features. Peak information of the audio signal obtained by the CTC model is calculated based on the implicit features. Attention calculation is performed based on the peak information and implicit feature sequences to obtain recognition results, and then the speech model of the usage scenario is used to make intention judgments.

The feature information of the usage scenario may include: acoustic features, language features and intention features. The acoustic features include the peak information, Softmax acoustic classification, etc. The language features include sentence structure information, Softmax language classification. The above two types of feature information are represented by multi-dimensional feature vectors. The intention features are one-dimensional vectors that can directly represent semantic information.

According to the method for mining feature information in the embodiments of the disclosure, more feature information of usage scenarios with scenario information is iteratively mined out from a fixed amount of raw audio data based on the scenario simulation, without depending on the accumulation of massive audio data, which effectively solves problems of missing scenario data, enabling feature information mining to be performed accurately and efficiently, and improving the efficiency and reliability in the feature information mining process. Meanwhile, a method for synthesizing audios with speeches is adopted to synthesize various missing data, which solves the problem of incomplete coverage of user intentions. Data is enriched by recording audios and collecting other media data. The scenario simulation methods are performed to continuously and iteratively mine features, thereby improving the accuracy and reducing false alarm rates.

Figure 2:
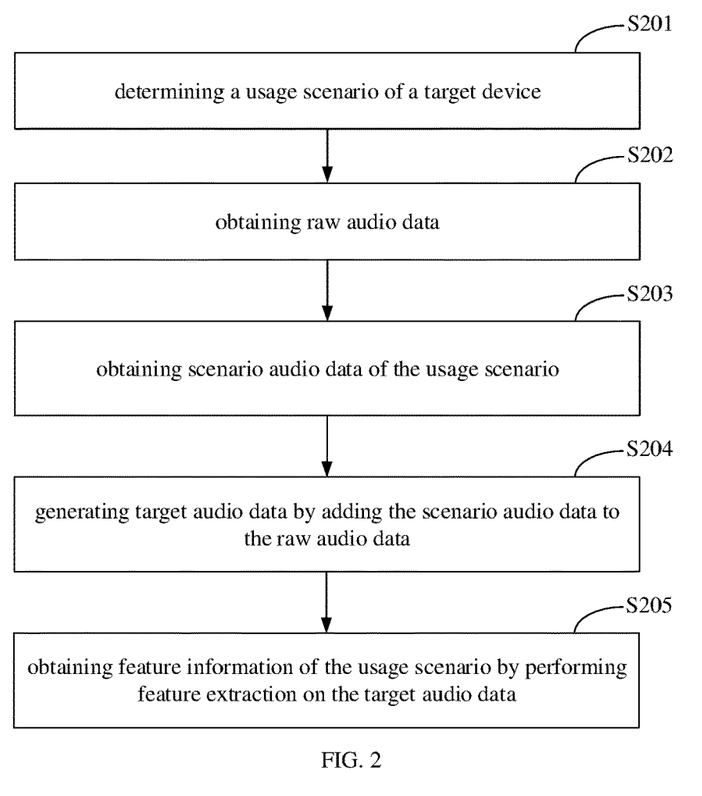
FIG. 2 is a schematic diagram according to a second embodiment of the disclosure.

FIG. 2 is a schematic diagram according to a second embodiment of the disclosure. As illustrated in FIG. 2, based on the above embodiment, the method for mining feature information of the embodiments includes the following blocks.

At block S201, a usage scenario of a target device is determined.

At block S202, raw audio data is obtained.

Blocks S201 to S202 are the same as the blocks S101 to S102 in the above embodiment, which are not repeated herein.

Block S103 in the above embodiment may specifically include the following blocks S203 to S204.

At block S203, scenario audio data of the usage scenario is obtained.

The scenario audio data may include: spatial reverberation data of the usage scenario, environmental noise data of the usage scenario, and residual noise data of the internal noise of the target device.

At block S204, target audio data is generated by adding the scenario audio data to the raw audio data.

It should be noted that the specific manner of adding the scenario audio data is not limited in the disclosure, which may be selected according to actual conditions.

When adding the environmental noise data of the usage scenario to the raw audio data, optionally, it is possible to add background noise data without distinguishing orientations when a distance is relatively remote. Optionally, when the distance is relatively close, the specific orientation is identified, and fixed-point noise data of the specific orientation is added.

At block S205, feature information of the usage scenario is obtained by performing feature extraction on the target audio data.

Block S205 is the same as block S104 in the above embodiment, which is not repeated here.

The process of obtaining the scenario audio data of the usage scenario is described with respect to different data included in the scenario audio data.

Figure 3:
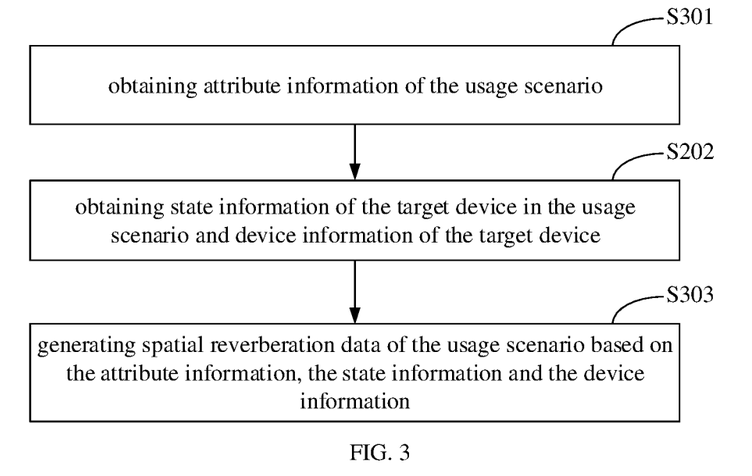
FIG. 3 is a schematic diagram according to a third embodiment of the disclosure.

Regarding the scenario audio data including the spatial reverberation data of the usage scenario, as a possible implementation, as illustrated in FIG. 3, the following blocks are included.

At block S301, attribute information of the usage scenario is obtained.

The attribute information of the usage scenario may be attribute information such as a size of the environment space and a distance of the sound source.

At block S302, state information of the target device in the usage scenario and device information of the target device are obtained.

The state information may include position information and orientation information. The device information may include information such as microphone operating state and microphone-related parameters.

At block S303, spatial reverberation data of the usage scenario is generated based on the attribute information, the state information and the device information.

In the embodiments of the disclosure, two sets of different convolution kernels are used for an audio of a single-channel signal, to turn the audio into a two-channel signal. The convolution kernel uses an impulse response function generated by a Room Impulse Response (RIR) method to generate a large amount of impulse response function data (RIR data) based on the attribute information, the state information and the device information. These data generate a large amount of reliable audio data with the scenario information, and then more audio feature information is iteratively mined out.

Regarding the scenario audio data including the environmental noise data of the usage scenario, as a possible implementation, optionally, the environmental noise data of the usage scenario is obtained from the noise database of the environmental noise data.

Figure 4:
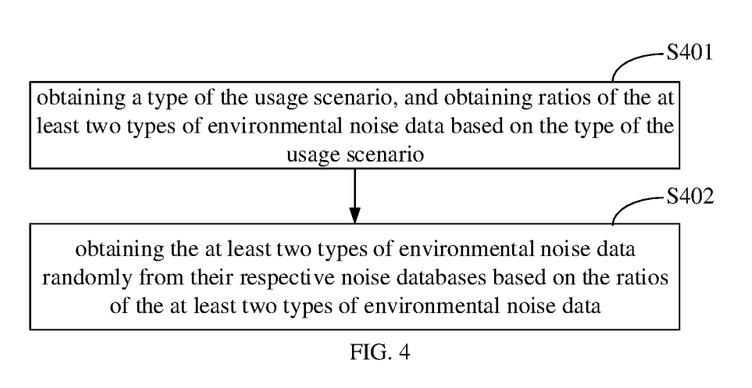
FIG. 4 is a schematic diagram according to a fourth embodiment of the disclosure.

In the embodiments of the disclosure, the environmental noise data includes at least two types of environmental noise data. In this case, as illustrated in FIG. 4, the specific process of obtaining the environmental noise data of the usage scenario from the noise database of the environmental noise data, includes the following blocks.

At block S401, a type of the usage scenario is obtained, and ratios of the at least two types of environmental noise data are obtained based on the type of the usage scenario.

It should be noted that in the usage scenarios of speech recognition products, there are often various environmental noises, which directly affect the accuracy of recognition. If the extracted audio features lack environmental noise, a significant decline in the ability to recognize speeches in noisy environments is inevitably caused. Therefore, in the embodiments of the disclosure, at least two types of environmental noise data need to be added to the raw audio data during the scenario simulation process, that is, the environmental noises are appropriately added to increase the robustness of the speech recognition model.

At block S402, the at least two types of environmental noise data are selected randomly from their respective noise databases based on the ratios of the at least two types of environmental noise data.

For example, when the ratios of three types of environmental noise data are 5%, 7%, and 3% respectively, at least two types of environmental noise data are randomly obtained from their respective noise databases.

Regarding the scenario audio data including the residual noise data of the internal noise of the target device, as a possible implementation, optionally, the residual noise data of the usage scenario is obtained from the residual database of the residual noise data.

In the embodiments of the disclosure, the residual noise data of the internal noise of the target device is obtained by querying a residual database of the residual noise data, and then the sounds from the device are distinguished to ensure the accuracy of mining.

It should be noted that, in general, the sounds from the device are called internal noises, such as music played by the device, and response words from the device. Most of these internal noises are cancelled by the echo cancellation (AEC) method, but there are still some sounds that have not been cancelled, which are referred to as residual speeches. The residual speeches may impact a certain interference to the recognition effect. These features help the model to distinguish the user's speeches from the sounds of the device. A large amount of data is generated based on the residual noise data by simulating the AEC process, and the residual data is appropriately added to the raw audio during the scenario simulation process.

According to the method for mining feature information of the embodiments of the disclosure, it is possible to obtain the scenario audio data of the usage scenario and add the scenario audio data to the raw audio data to generate the target audio data, thereby realizing the scenario simulation, enabling more feature information of the usage scenarios with scenario information be iteratively mined out of the raw audio data, which effectively solves the problem of missing scenario data.

Figure 5:
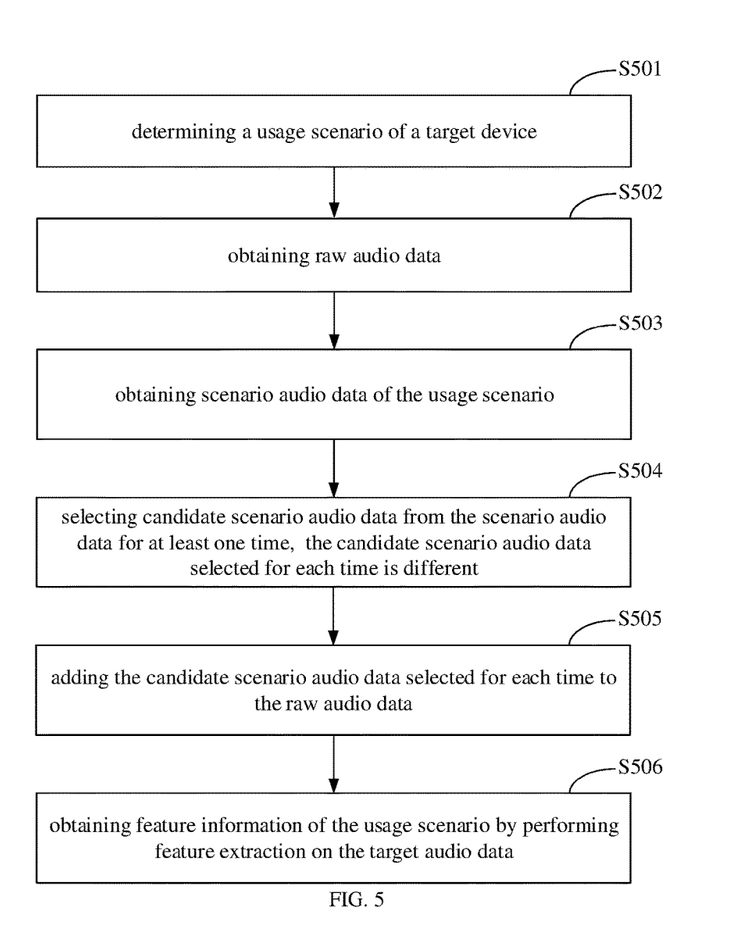
FIG. 5 is a schematic diagram according to a fifth embodiment of the disclosure.

FIG. 5 is a schematic diagram according to a fifth embodiment of the disclosure. As illustrated in FIG. 5, based on the above embodiments, the information querying method proposed in the embodiment includes the following blocks.

At block S501, a usage scenario of a target device is determined.

At block S502, raw audio data is obtained.

Blocks S501 to S502 are the same as the blocks S101 to S102 in the above embodiments, which are not repeated here.

At block S503, scenario audio data of the usage scenario is obtained.

Block S503 is the same as block S203 in the above embodiments, which is not repeated here.

Block S204 in the above embodiments may include the following blocks S504 to S505.

At block S504, candidate scenario audio data is selected from the scenario audio data for at least one time. The candidate scenario audio data selected for each time is different.

For example, the candidate scenario audio data selected from the scenario audio data last time is the spatial reverberation data of the usage scenario. In this case, the environmental noise data of the usage scenario is selected at this time.

At block S505, the candidate scenario audio data selected for each time is added to the raw audio data.

For example, the candidate scenario audio data selected from the scenario audio data last time is the spatial reverberation data of the usage scenario, and the spatial reverberation data is added to the raw audio data. In this case, at this time, the environmental noise data of the usage scenario is selected, and the spatial reverberation data is added to the raw audio data.

At block S506, feature information of the usage scenario is obtained by performing feature extraction on the target audio data.

Block S506 is the same as block S104 in the above embodiments, which is not repeated here.

After obtaining the feature information of the usage scenario, a large number of feature information of the usage scenario with the scenario information is obtained. In this case, a speech model of the usage scenario may be constructed or trained based on the feature information of the usage scenario.

According to the method for mining feature information in the embodiments of the disclosure, the problem may be solved that incomplete audio data volume and audio feature coverage in the process of constructing or training the speech model of the usage scenario. Through the scenario simulation method, more audio features with scenario information are iteratively mined from a fixed amount of raw audio, which effectively solves the problem of missing scenario data. Through the collection of speech synthesis data, recorded audio data, and other media data, the content coverage problem is solved.

It should be noted that the method for mining feature information in the disclosure may be applied in a variety of scenarios.

Figure 6:
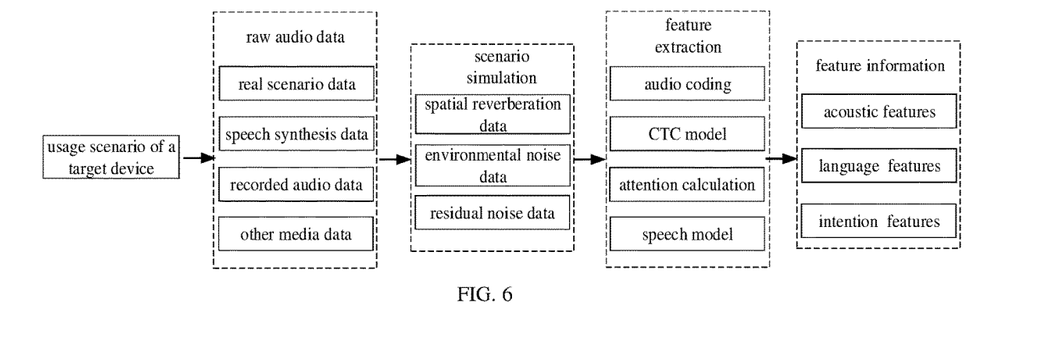
FIG. 6 is a schematic diagram of a process for mining feature information.

For the smart home control application scenario, as illustrated in FIG. 6, a usage scenario of lighting devices may be determined as a bedroom. The real scenario data, speech synthesis data, recorded audio data and other media data are obtained. Based on speech recognition and machine learning technologies, the spatial reverberation data, the environmental noise data and the residual noise data are added to the raw audio data to simulate the usage scenario, and then the target audio data of the usage scenario is generated. Further, based on artificial intelligence technologies such as deep learning, feature extraction may be performed on the target audio data through the audio coding, CTC model, attention calculation and speech model, to obtain feature information such as acoustic features, language features, and intention features of the usage scenario.

According to the method for mining feature information in the embodiments of the disclosure, more feature information of usage scenarios with scenario information is iteratively mined out from a fixed amount of raw audio data based on the scenario simulation, without depending on the accumulation of massive audio data, which effectively solves problems of missing scenario data, enabling feature information mining to be performed accurately and efficiently, and improving the efficiency and reliability in the feature information mining process. Meanwhile, a method for synthesizing audios with speeches is adopted to synthesize various missing data, which solves the problem of incomplete coverage of user intentions. Data is enriched by recording audio and collecting other media data. The scenario simulation methods are performed to continuously and iteratively mine features, thereby improving accuracy and reducing false alarm rates.

Corresponding to the methods for mining feature information according to several embodiments of the disclosure, embodiments of the disclosure also provide apparatuses for mining feature information. Since the apparatuses for mining feature information according to the embodiments of the disclosure correspond to the methods for mining feature information according to the embodiments of the disclosure, the implementation of the methods for mining feature information is also applicable to the apparatuses for mining feature information according to the embodiments, which is not described in detail in the embodiment.

Figure 7:
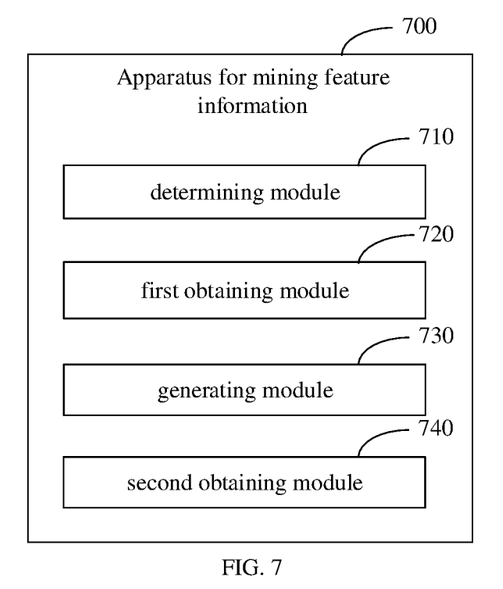
FIG. 7 is a structural block diagram of an apparatus for mining feature information used to implement the method for mining feature information according to embodiments of the disclosure.

FIG. 7 is a structural block diagram of an apparatus for mining feature information according to embodiments of the disclosure.

As illustrated in FIG. 7, the apparatus for mining feature information 700 includes: a determining module 710, a first obtaining module 720, a generating module 730 and a second obtaining module 740. The determining module 710 is configured to determine a usage scenario of a target device. The first obtaining module 720 is configured to obtain raw audio data. The generating module 730 is configured to generate target audio data of the usage scenario by simulating the usage scenario based on the raw audio data. The second obtaining module 740 is configured to obtain feature information of the usage scenario by performing feature extraction on the target audio data.

Figure 8:
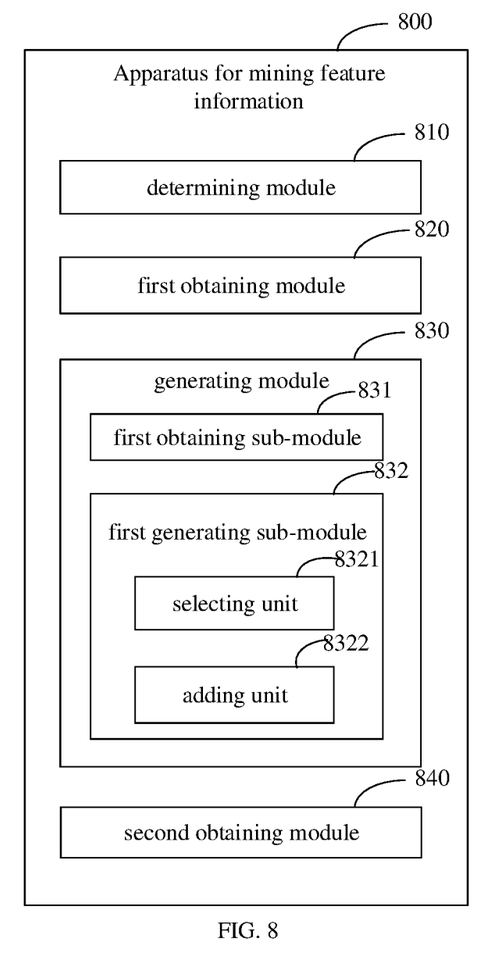
FIG. 8 is a structural block diagram of an apparatus for mining feature information used to implement the method for mining feature information according to embodiments of the disclosure.

FIG. 8 is a structural block diagram of an apparatus for mining feature information according to embodiments of the disclosure.

As illustrated in FIG. 8, the apparatus for mining feature information 800 includes: a determining module 810, a first obtaining module 820, a generating module 830 and a second obtaining module 840.

The generating module 830 includes: a first obtaining sub-module 831 and a first generating sub-module 832. The first obtaining sub-module 831 is configured to obtain scenario audio data of the usage scenario. The first generating sub-module 832 is configured to generate the target audio data by adding the scenario audio data to the raw audio data.

Optionally, the scenario audio data includes spatial reverberation data of the usage scenario, and the first obtaining sub-module 831 is further configured to: obtain attribute information of the usage scenario; obtain state information of the target device in the usage scenario and device information of the target device; and generate the spatial reverberation data of the usage scenario based on the attribute information, the state information and the device information.

Optionally, the scenario audio data includes environmental noise data of the usage scenario, and the first obtaining sub-module 831 is further configured to: obtain the environmental noise data of the usage scenario from a noise database of the environmental noise data.

In an embodiment, the environmental noise data includes at least two types of environmental noise data, and the first obtaining sub-module 831 is further configured to: obtain a type of the usage scenario, and obtain ratios of the at least two types of environmental noise data based on the type of the usage scenario; and obtain the at least two types of environmental noise data randomly from their respective noise databases based on the ratios of the at least two types of environmental noise data.

Optionally, the scenario audio data includes residual noise data of internal noise of the target device, and the first obtaining sub-module 831 is further configured to: obtain the residual noise data of the usage scenario from a residual database of the residual noise data.

The first generating sub-module 832 includes: a selecting unit 8321 and an adding unit 8322. The selecting unit 8321 is configured to select candidate scenario audio data from the scenario audio data for at least one time. The candidate scenario audio data selected for each time is different. The adding unit 8322 is configured to add the candidate scenario audio data selected for each time to the raw audio data.

The second obtaining module 840 is further configured to: construct or train a speech model of the usage scenario based on the feature information of the usage scenario.

It should be noted that the determining module 810 and the first obtaining module 820 have the same function and structure as the determining module 710 and the first obtaining module 720.

With the apparatus for mining feature information of the embodiments of the disclosure, more feature information of usage scenarios with scenario information is iteratively mined out from a fixed amount of raw audio data based on the scenario simulation, without depending on the accumulation of massive audio data, which effectively solves problems of missing scenario data, s enabling feature information mining to be performed accurately and efficiently, and improving the efficiency and reliability in the feature information mining process. Meanwhile, a method for synthesizing audios with speeches is adopted to synthesize missing data, which solves the problem of incomplete coverage of user intentions. Data is enriched by recording audio and collecting other media data. The scenario simulation methods are performed to continuously and iteratively mine features, thereby improving the accuracy and reducing false alarm rates.

According to the embodiments of the disclosure, the disclosure also provides an electronic device and a readable storage medium.

Figure 9:
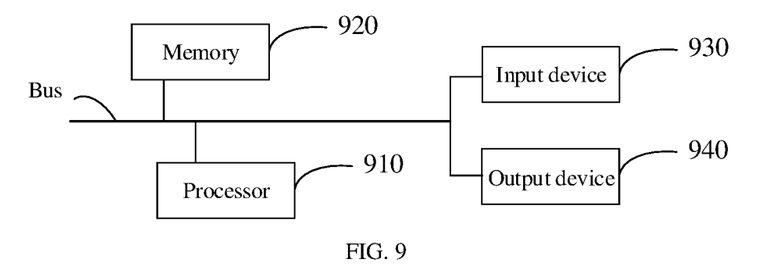
FIG. 9 is a block diagram of an electronic device configured for mining feature information according to embodiments of the disclosure.

FIG. 9 is a block diagram of an electronic device configured for mining feature information according to embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 9, the electronic device includes: one or more processors 910, a memory 920, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 910 is taken as an example in FIG. 9.

The memory 920 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 920 is configured to store non-transitory software programs, non-transitory computer executable programs and modules, such as program instructions/modules (for example, the determining module 710, the first obtaining module 720, the generating module 730, and the second obtaining module 740 shown in FIG. 7) corresponding to the method in the embodiments of the disclosure. The processor 910 executes various functional applications and data processing of the electronic device by running non-transitory software programs, instructions, and modules stored in the memory 920, that is, implementing the method in the foregoing method embodiments.

The memory 920 may include a storage program area and a storage data area, where the storage program area may store an operating system and application programs required for at least one function. The storage data area may store data created according to the use of the electronic device for implementing the method. In addition, the memory 920 may include a high-speed random access memory, and a non-transitory memory, such as at least one magnetic disk storage device, a flash memory device, or other non-transitory solid-state storage device. In some embodiments, the memory 920 may optionally include a memory remotely disposed with respect to the processor 910, and these remote memories may be connected to the electronic device for implementing the method through a network. Examples of the above network include, but are not limited to, the Internet, an intranet, a local area network, a mobile communication network, and combinations thereof.

The electronic device used to implement the method may further include: an input device 930 and an output device 940. The processor 910, the memory 920, the input device 930, and the output device 940 may be connected through a bus or in other manners. In FIG. 9, the connection through the bus is taken as an example.

The input device 930 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 940 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or a computing system that includes any combination of such background components, intermediate computing components, or front-end components. The components of the system may be interconnected by any form or medium of digital data communication (e.g., a communication network). Examples of communication networks include: a local area network (LAN), a wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve defects such as difficult management and weak business scalability in the traditional physical host and Virtual Private Server (VPS) service. The server may also be a server of a distributed system, or a server combined with a blockchain.

With the apparatus for mining feature information of the embodiments of the disclosure, more feature information of usage scenarios with scenario information is iteratively mined out from a fixed amount of raw audio data based on scenario simulation, without depending on the accumulation of massive audio data, which effectively solves problems of missing scenario data, enabling feature information mining to be performed accurately and efficiently, and improving the efficiency and reliability in the feature information mining process. Meanwhile, a method for synthesizing audios with speeches is adopted to synthesize various missing data, which solves the problem of incomplete coverage of user intentions. Data is enriched by recording audio and collecting other media data. The scenario simulation methods are performed to continuously and iteratively mine features, thereby improving the accuracy and reducing false alarm rates.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for mining feature information, comprising:
   determining a usage scenario of a target device;
   obtaining raw audio data including real scenario data, speech synthesis data, recorded audio data and other media data;
   generating target audio data of the usage scenario by simulating the usage scenario based on the raw audio data; and
   obtaining feature information of the usage scenario by performing feature extraction on the target audio data.

2. The method according to claim 1, wherein generating the target audio data of the usage scenario by simulating the usage scenario based on the raw audio data comprises:
   obtaining scenario audio data of the usage scenario; and
   generating the target audio data by adding the scenario audio data to the raw audio data.

3. The method according to claim 2, wherein the scenario audio data comprises spatial reverberation data of the usage scenario, and obtaining the scenario audio data of the usage scenario comprises:
   obtaining attribute information of the usage scenario;
   obtaining state information of the target device in the usage scenario and device information of the target device; and
   generating the spatial reverberation data of the usage scenario based on the attribute information, the state information and the device information.

4. The method according to claim 2, wherein the scenario audio data comprises environmental noise data of the usage scenario, and obtaining the scenario audio data of the usage scenario comprises:
   obtaining the environmental noise data of the usage scenario from a noise database of the environmental noise data.

5. The method according to claim 4, wherein the environmental noise data comprises at least two types of environmental noise data, and obtaining the environmental noise data of the usage scenario from the noise database of the environmental noise data, comprises:
   obtaining a type of the usage scenario, and obtaining ratios of the at least two types of environmental noise data based on the type of the usage scenario; and
   obtaining the at least two types of environmental noise data randomly from their respective noise databases based on the ratios of the at least two types of environmental noise data.

6. The method according to claim 2, wherein the scenario audio data comprises residual noise data of internal noises of the target device, and obtaining the scenario audio data of the usage scenario comprises:
   obtaining the residual noise data of the usage scenario from a residual database of the residual noise data.

7. The method according to claim 2, wherein generating the target audio data by adding the scenario audio data to the raw audio data, comprises:
   selecting candidate scenario audio data from the scenario audio data for at least one time, wherein the candidate scenario audio data selected for each time is different; and
   adding the candidate scenario audio data selected for each time to the raw audio data.

8. The method according to claim 1, after obtaining the feature information of the usage scenario, further comprising:
   constructing or training a speech model of the usage scenario based on the feature information of the usage scenario.

9. An apparatus for mining feature information, comprising:
   at least one processor; and
   a memory communicatively coupled to the at least one processor and stored with instructions executable by the at least one processor,
   wherein the at least one processor is configured to:
   determine a usage scenario of a target device;
   obtain raw audio data including real scenario data, speech synthesis data, recorded audio data and other media data;
   generate target audio data of the usage scenario by simulating the usage scenario based on the raw audio data; and
   obtain feature information of the usage scenario by performing feature extraction on the target audio data.

10. The apparatus according to claim 9, wherein the at least one processor is further configured to:
    obtain scenario audio data of the usage scenario; and
    generate the target audio data by adding the scenario audio data to the raw audio data.

11. The apparatus according to claim 10, wherein the scenario audio data comprises spatial reverberation data of the usage scenario, and the at least one processor is further configured to:
    obtain attribute information of the usage scenario;

obtain state information of the target device in the usage scenario and device information of the target device; and generate the spatial reverberation data of the usage scenario based on the attribute information, the state information and the device information.

12. The apparatus according to claim 10, wherein the scenario audio data comprises environmental noise data of the usage scenario, and the at least one processor is further configured to:

obtain the environmental noise data of the usage scenario from a noise database of the environmental noise data;

wherein the environmental noise data comprises at least two types of environmental noise data, and the at least one processor is further configured to:

obtain a type of the usage scenario, and obtain ratios of the at least two types of environmental noise data based on the type of the usage scenario; and obtain the at least two types of environmental noise data randomly from their respective noise databases based on the ratios of the at least two types of environmental noise data.

13. The apparatus according to claim 10, wherein the scenario audio data comprises residual noise data of internal noises of the target device, and the at least one processor is further configured to:

obtain the residual noise data of the usage scenario from a residual database of the residual noise data.

14. The apparatus according to claim 10, wherein the at least one processor is further configured to:

select candidate scenario audio data from the scenario audio data for at least one time, wherein the candidate scenario audio data selected for each time is different; and add the candidate scenario audio data selected for each time to the raw audio data.

15. The apparatus according to claim 9, wherein the at least one processor is further configured to:

construct or train a speech model of the usage scenario based on the feature information of the usage scenario.

16. A non-transitory computer-readable storage medium storing computer instructions, wherein the computer instructions are configured to cause a computer to execute a method for mining feature information, the method comprises:

determining a usage scenario of a target device;

obtaining raw audio data including real scenario data, speech synthesis data, recorded audio data and other media data;

generating target audio data of the usage scenario by simulating the usage scenario based on the raw audio data; and obtaining feature information of the usage scenario by performing feature extraction on the target audio data.

17. The storage medium according to claim 16, wherein generating the target audio data of the usage scenario by simulating the usage scenario based on the raw audio data comprises:

obtaining scenario audio data of the usage scenario; and generating the target audio data by adding the scenario audio data to the raw audio data.

18. The storage medium according to claim 17, wherein the scenario audio data comprises spatial reverberation data of the usage scenario, and obtaining the scenario audio data of the usage scenario comprises:

obtaining attribute information of the usage scenario;

obtaining state information of the target device in the usage scenario and device information of the target device; and generating the spatial reverberation data of the usage scenario based on the attribute information, the state information and the device information.

19. The storage medium according to claim 17, wherein the scenario audio data comprises environmental noise data of the usage scenario, and obtaining the scenario audio data of the usage scenario comprises:

obtaining the environmental noise data of the usage scenario from a noise database of the environmental noise data;

wherein the environmental noise data comprises at least two types of environmental noise data, and obtaining the environmental noise data of the usage scenario from the noise database of the environmental noise data, comprises:

obtaining a type of the usage scenario, and obtaining ratios of the at least two types of environmental noise data based on the type of the usage scenario; and obtaining the at least two types of environmental noise data randomly from their respective noise databases based on the ratios of the at least two types of environmental noise data.

20. The storage medium according to claim 17, wherein the scenario audio data comprises residual noise data of internal noises of the target device, and obtaining the scenario audio data of the usage scenario comprises:

obtaining the residual noise data of the usage scenario from a residual database of the residual noise data.

\* \* \* \* \*